(12) United States Patent
Carrier et al.

(10) Patent No.: US 10,198,686 B2
(45) Date of Patent: Feb. 5, 2019

(54) CONTACTLESS CHIP CARD WITH DUAL ANTENNA

(71) Applicant: SMART PACKAGING SOLUTIONS, Rousset (FR)

(72) Inventors: Cécile Carrier, Rousset (FR); Haig Kambourian, Rousset (FR); Benjamin Mear, Rousset (FR)

(73) Assignee: SMART PACKAGING SOLUTIONS, Rousset (FR)

( * ) Notice: Subject to any disclaimer, the term of this patent is extended or adjusted under 35 U.S.C. 154(b) by 0 days.

(21) Appl. No.: 15/548,299

(22) PCT Filed: Feb. 3, 2016

(86) PCT No.: PCT/FR2016/000015
§ 371 (c)(1),
(2) Date: Aug. 2, 2017

(87) PCT Pub. No.: WO2016/124827
PCT Pub. Date: Aug. 11, 2016

(65) Prior Publication Data
US 2018/0018551 A1    Jan. 18, 2018

(30) Foreign Application Priority Data

Feb. 2, 2015   (FR) .................................. 15 00184

(51) Int. Cl.
*G06K 19/077* (2006.01)
*G06K 7/10* (2006.01)

(52) U.S. Cl.
CPC ... *G06K 19/07777* (2013.01); *G06K 7/10178* (2013.01); *G06K 19/07722* (2013.01);
(Continued)

(58) Field of Classification Search
CPC ....... G06K 19/07747; G06K 19/07777; G06K 19/07779; G06K 19/07783;
(Continued)

(56) References Cited

U.S. PATENT DOCUMENTS 6,378,774 B1    4/2002   Emori et al.
2011/0215909 A1  9/2011   Rancien et al.
(Continued)

FOREIGN PATENT DOCUMENTS

EP    1 031 939 A1    8/2000
FR    2 936 075 A1    3/2010
(Continued)

OTHER PUBLICATIONS

International Search Report (PCT/ISA/210) dated May 6, 2016, by the French Patent Office as the International Searching Authority for International Application No. PCT/FR2016/000015.

*Primary Examiner* — Claude J Brown
(74) *Attorney, Agent, or Firm* — Buchanan Ingersoll & Rooney PC

(57) ABSTRACT

An insert for a chip card includes a body provided with a cavity in which is inserted an electronic module provided with a microelectronic chip connected to an inductive or capacitive coupling. The body has a stack of layers at least a first layer of which comprises a first booster antenna and a second layer of which comprises a second booster antenna, the various booster antennas being coupled together inductively and/or capacitively, and at least one of the booster antennas being coupled inductively and/or capacitively with the coupling of the module. The body furthermore comprises at least one metal plate disposed between two layers of ferrite, the first and second booster antennae and the metallic plate being arranged in such a way that at least one of the two booster antennas and the electronic module remain (Continued)

coupled together inductively and/or capacitively, despite the presence of the metal plate.

15 Claims, 7 Drawing Sheets

(52) U.S. Cl.
CPC . *G06K 19/07728* (2013.01); *G06K 19/07756* (2013.01); *G06K 19/07769* (2013.01); *G06K 19/07771* (2013.01); *G06K 19/07788* (2013.01); *G06K 19/07794* (2013.01); *G06K 19/07747* (2013.01); *G06K 19/07779* (2013.01); *G06K 19/07783* (2013.01); *G06K 19/07784* (2013.01)

(58) Field of Classification Search
CPC ....... G06K 19/07784; G06K 19/07788; G06K 19/07794; G06K 7/10178; G06K 19/07722; G06K 19/07728; G06K 19/07756; G06K 19/07769; G06K 19/07771

USPC .......................................................... 235/492
See application file for complete search history.

(56) References Cited

U.S. PATENT DOCUMENTS

| 2015/0206047 A1* | 7/2015 | Herslow | G06K 19/07779 235/492 |
| 2015/0235122 A1* | 8/2015 | Finn | G06K 19/07794 235/439 |
| 2016/0180212 A1* | 6/2016 | Herslow | G06K 19/07773 235/492 |

FOREIGN PATENT DOCUMENTS

| WO | WO 2014/003409 A1 | 1/2014 |
| WO | WO 2014/113765 A1 | 7/2014 |

* cited by examiner

CONTACTLESS CHIP CARD WITH DUAL ANTENNA

The invention relates to contactless or hybrid contact/contactless identification cards provided with a metal plate for reinforcing or increasing the weight of the card.

PRIOR ART

Most known contactless or hybrid contact/contactless chip cards include a pre-laminated insert including a card body made of plastic, an electronic module located in a cavity of the body of the insert and provided with a microchip, and an antenna placed in the body of the insert and electrically connected to output pads of the microchip. Some of these chip cards have an antenna placed in the card body, said antenna being arranged so as to be inductively coupled to the electronic module that itself is provided with an antenna.

Chip cards and their inserts have a format standardized according to standard ISO 7810, and they are in general made of plastic for reasons of cost and flexibility.

However, a segment of the market that is seeing growth is that of contactless chip cards or hybrid contact/contactless chip cards that have physical characteristics that make them feel more exclusive or high-end, because of their greater weight, which ensures a more satisfying sensation when the card is handled.

Plastic cards provided with a magnetic strip, and the card body of which is provided with a metal layer, are known. However, contactless chip cards or chip-card inserts with such features do not currently exist.

Specifically, as is known, inserting a metal plate into such cards has adverse consequences from the electromagnetic point of view, since the metal plate forms a partial or even substantial shield blocking electromagnetic waves that would otherwise propagate between the contactless chip card and a chip-card reader. With a prior-art contactless card, this may result either in a decrease in contactless communication performance, or in the operation of the card in contactless mode becoming asymmetric, i.e. to its operation in contactless mode being degraded on one side with respect to its operation on the other side.

A structure comprising two chips provided with booster antennae is also known from document FR 2 936 075 A1, said structure being incorporable into a chip card in order to increase the range at which the chips may be read. The card body includes an electromagnetic perturbation system made of aluminum, but the aluminum film creates a shielding effect that prevents the booster antennae from being coupled to each other.

AIM OF THE INVENTION

The general aim of the invention is therefore to provide an optimized structure for an insert for a contactless chip card or hybrid chip card, which structure is provided with a metal plate that increases the weight of the card, without this design having any perceptible adverse consequences on the operation of the chip card in contactless mode.

One particular aim of the invention is to provide a chip card that is reinforced and heavier, and the operation of which in contactless mode is equally effective whichever side of the chip card is oriented toward the card reader, or whatever the orientation of the chip card with respect to the contactless reader.

SUMMARY OF THE INVENTION

According to the principle of the invention, a metal plate is incorporated into the card body, in particular in an insert used to manufacture the card, and this insert possesses two antennae that are substantially in the standardized format called the ID1 format of standard ISO/CEI 7810. The ISO/CEI 7810 standard is an international standard that defines four formats for identification or identity cards: ID-1, ID-2, ID-3 and ID-000. The ID-1 format measures 85.60×53.98 mm. It is commonly used for bank cards (credit cards, debit cards, ATM cards, etc.). For the sake of simplicity, antennae that are substantially in the ID-1 format will be referred to as "ID1 antennae". They therefore extend around the perimeter of an insert, or of a chip card, in the ID1 format. They are located on either side of the metal plate and are each provided with a coupling means that is connected in series with the ID1 antenna and that consists either of an inductive coupling taking the form of a concentrator antenna, or of a capacitive coupling. The ID1 antennae and their coupling means, and the metal plate, are arranged in the insert in such a way that the coupling means are electromagnetically coupled together and coupled to an antenna located on the microelectronic module, so that the electromagnetic flux of the reader reaches at least one of the two ID1-format antennae and its coupling means. The electromagnetic flux of the reader therefore reaches the antenna of the microelectronic module via the ID1 antennae and their respective capacitive coupling or concentrator, whatever the orientation of the chip card incorporating the insert according to the invention.

Therefore, a first subject of the invention is an insert for a contactless or hybrid contact/contactless chip card, said insert including a body provided with a cavity in which an electronic module provided with a microchip that is connected to a capacitive or inductive coupling means is located, characterized in that the body is formed from a stack of layers at least one first layer of which includes a first booster antenna and one second layer of which includes a second booster antenna, the various booster antennae being coupled together inductively and/or capacitively, and at least one of the booster antennae being coupled inductively and/or capacitively to the coupling means of the module, and in that the body furthermore includes at least one metal plate that is placed between two ferrite layers, said first and second booster antennae and said metal plate being arranged so that at least one of the two booster antennae and the electronic module remain inductively and/or capacitively coupled to each other despite the presence of the metal plate.

This chip-card structure and its variant embodiments therefore make it possible to ensure quality radiofrequency communication between a chip card provided with such an insert and a chip-card reader, despite the presence, in the structure, of metal plates intended to increase the weight of and reinforce the card, and that, without the invention, would be of a nature to prevent the card from communicating effectively with the reader.

According to one first embodiment of the invention, the electronic module is an inductive module provided with an antenna, and each booster is composed of an antenna that is in what is called the ID1 format, said antenna being connected in series or parallel with a concentrator antenna and with a capacitor for adjusting the resonant frequency of each booster, the concentrator antennae of each booster and the antenna of the electronic module being located substantially facing each other so as to allow the module and the two concentrator antennae to be inductively coupled, allowing the module and a remote reader to communicate.

Advantageously, said metal plate and the ferrite layers are provided with an aperture in the zone of overlap of the two concentrators, so as to facilitate the electromagnetic coupling of the two concentrators and to even further decrease the electromagnetic shielding effect due to the metal plate.

According to one variant embodiment of the insert, the electronic module is an inductive module provided with an antenna and the insert includes a first booster provided with an antenna that is in what is called the ID1 format, said antenna being connected in series with a first concentrator that is located substantially facing the antenna of the module and a second concentrator, and the insert includes a second booster provided with an antenna that is in the ID1 format, said antenna being connected in series with a third concentrator, the second and third concentrators being located substantially facing, so as to allow the first concentrator and the third concentrator to be coupled via the second concentrator, without the first and third concentrators needing to be located facing.

According to another embodiment of the chip-card insert using an inductive electronic module provided with an antenna, the metal plate is formed from two half-plates that are electrically insulated from each other. The insert includes a first booster including an antenna that is substantially in the ID1 format and a concentrator antenna in series or in parallel and said first booster furthermore includes two metal stubs allowing capacitive connections to be made with a first metal half-plate. The chip-card insert furthermore includes a second booster including an antenna that is substantially in the ID1 format and also two metal stubs allowing capacitive connections to be made with a second metal half-plate.

According to another advantageous embodiment of the invention, the inductive module is replaced by a capacitive module, and the concentrator of the first booster located facing the module is replaced by metal stubs that are able to establish a capacitive link between said first booster and said capacitive module. This structure makes it possible to omit concentrators from the boosters.

According to embodiments, the ID1 antennae of the boosters may be connected in parallel and connected in parallel or in series with a capacitor for adjusting the resonant frequency of each booster.

A second subject of the invention is a chip card incorporating an insert such as described above, and one or more plastic layers placed on either side of the insert.

Of course, the denser and thicker the metal plate, the more noticeable the weight-increasing effect will be. However, in the context of cards of conventional thickness, in particular of thickness corresponding to standard ISO 7810, the metal plate will have a thickness of about 100 microns to 400 microns, and the total thickness of the card will be comprised between 680 microns and 950 microns, and preferably between 680 and 840 microns.

The metal plate will have a weight of about 10 to 25 grams, so that the total weight of the chip card incorporating the insert with its metal plate will be about 15 to 30 grams, substantially greater than the weight of about 5 grams of known contactless cards.

To achieve this result, the metal plate will possibly be manufactured from a heavy metal, in particular tungsten, gold, iridium, osmium, platinum or silver, and preferably tungsten.

Other features and advantages of the invention will become apparent on reading the detailed description and from the appended drawings, in which.

DETAILED DESCRIPTION

In order to facilitate comprehension, the thicknesses of the layers of materials in the cross-sectional views (FIGS. 4, 8, 12 and 16) have been exaggerated with respect to the length of the card, but the ratios between these thicknesses are substantially as they would be in an actual chip card.

Identical elements in the various figures have been given the same reference numbers.

The reader is referred to FIGS. 1 to 4 corresponding to a first embodiment of the invention. The insert of the chip card comprises a substantially symmetric stack composed of a metal plate 11 flanked on either side by a ferrite layer 8 that is surmounted by a first booster antenna.

By "booster" antenna or "booster" what is meant, in the context of the present application, is an antenna that is substantially in the ID1 format, which antenna is connected in series or parallel with a resonant capacitor, and connected in series or in parallel with a capacitive or inductive means for coupling to another booster or to a microelectronic module, or to both.

In the case of an inductive coupling means, it will be referred to as a concentrator antenna or, strictly speaking incorrectly, as a "concentrator", namely an antenna of smaller size than the ID1 antenna and the aim of which is to couple to an antenna of substantially the same size, namely the antenna of an inductive module or another concentrator. The antenna of a contactless chip-card reader is typically larger than the antenna of the module of the chip card or the concentrator antenna, so that the coupling between the concentrator and the reader is negligible compared to the coupling between the reader and the ID1 antenna.

Figure 1:
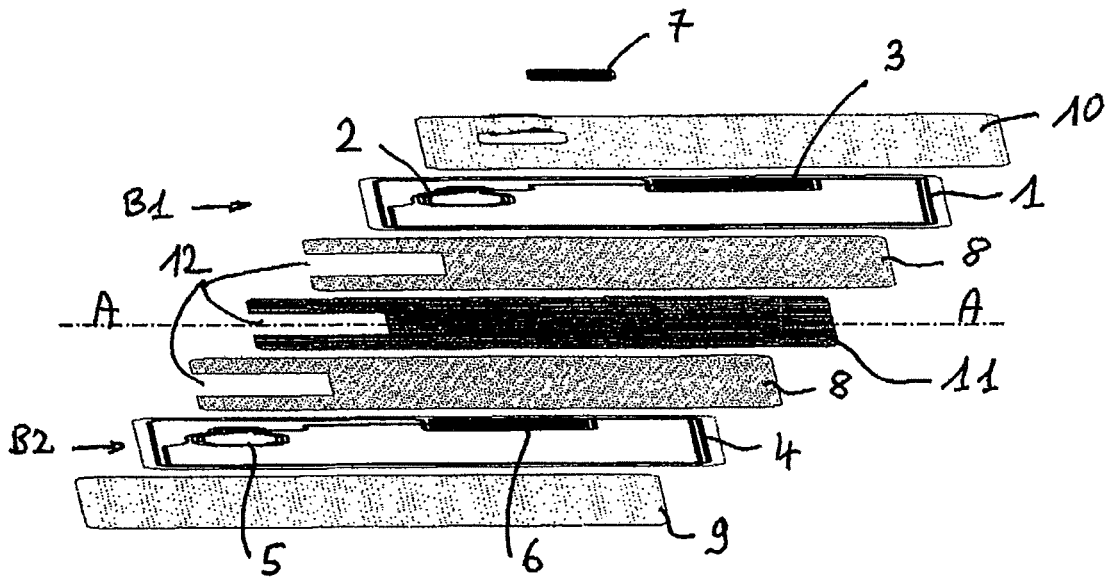
FIG. 1 shows an exploded perspective view of a chip card incorporating an insert according to the invention, according to a first embodiment.

Thus, in the case of FIG. 1, a first booster antenna (booster B1) is composed of an antenna 1 in the ID1 format, which antenna is connected in series with a concentrator antenna 2 and a capacitor 3 for adjusting the resonant frequency of this first booster antenna. A second booster antenna (booster B2) is composed of an antenna 4 in the ID1 format, which antenna is connected in series with a concentrator antenna 5 and a capacitor 6 for adjusting the resonant frequency of this second booster antenna B2. Each booster B1, B2 is covered with a protective layer 9, 10, and one of the two protective layers 10 includes a cavity receiving a microelectronic module 7 that may be a conventional contactless chip-card module, or a hybrid contact/contactless module. FIG. 1 does not show certain additional layers that have no bearing on the invention, in particular adhesive layers for binding the various components. They are shown by way of example in the cross-sectional view of FIG. 4.

In order to increase the weight of the insert and therefore the weight of the chip card, the metal plate 11 is made of a heavy metal, in particular selected from tungsten, gold, silver, platinum, iridium and osmium, though it will be understood that tungsten doubtlessly represents the best compromise between a high weight and a reasonable cost.

The ferrite layers 8 serve to attenuate electromagnetic perturbations due to the presence of the metal plate 11.

Furthermore, in this first embodiment of the invention, the two concentrators 2, 5 are superposed and located facing each other in order to ensure a good electromagnetic connection between the two boosters B1, B2. In order to yet further optimize this connection and to minimize the perturbations due to the metal plate, the metal plate 11 and the ferrite layers 8 possess apertures 12 that are located facing the concentrators 2, 5, thereby allowing electromagnetic flux to easily pass between the two boosters, via their two concentrators and the apertures 12 in the ferrite plates and the metal layer 11. The external protective layers 9, 10 of the insert are known per se in the field of chip cards and are for example made of a transparent plastic.

Figure 4:
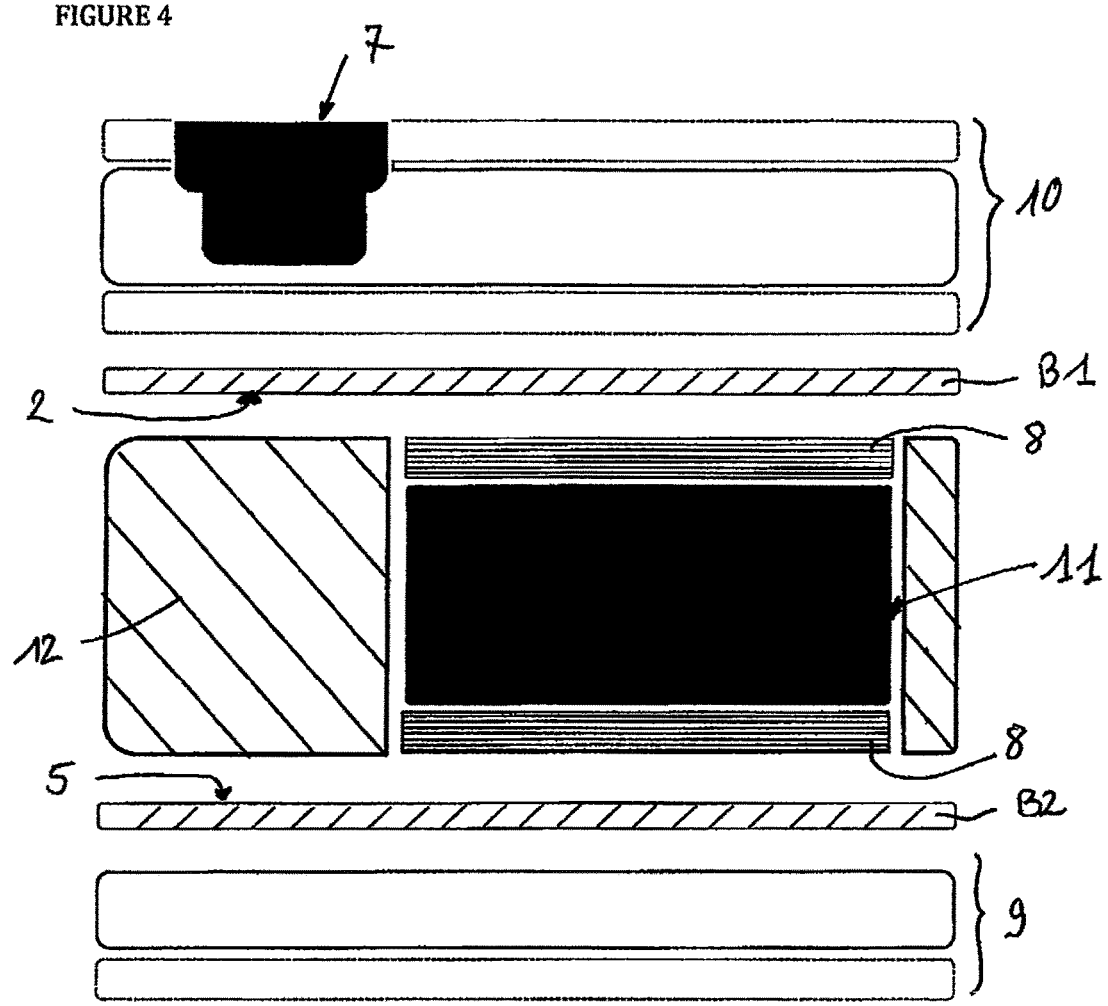
FIG. 4 shows a schematic cross-sectional view of the chip card cut along the line A-A of FIG. 1.
Figure 5:
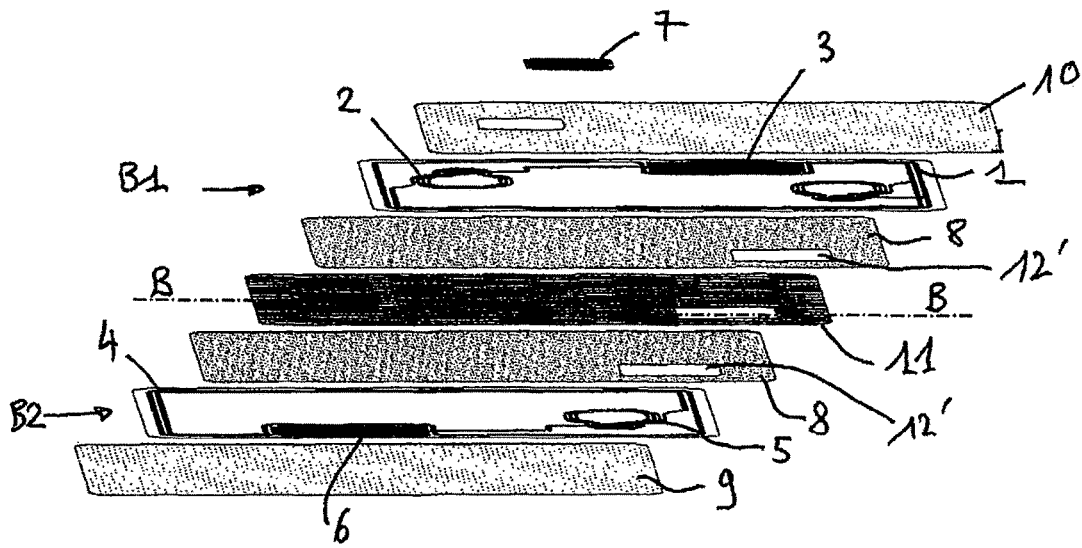
FIG. 5 shows an exploded perspective view of a chip card according to the invention, according to a second embodiment.
Figure 6:
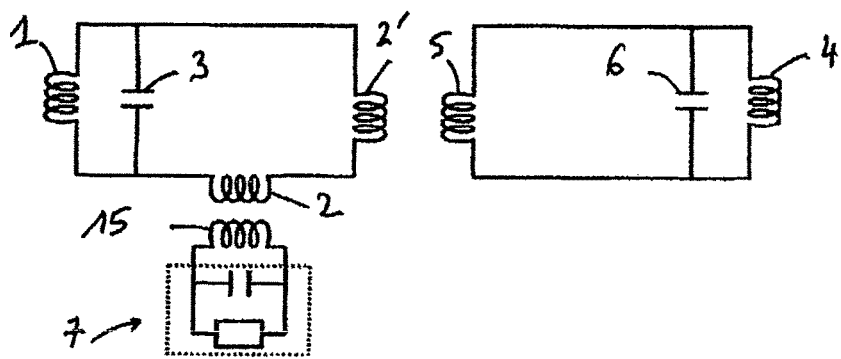
FIG. 6 shows an equivalent circuit diagram of the chip card of FIG. 5, in the case of ID1 antennae having their resonant capacitors connected in parallel with said antennae.
Figure 7:
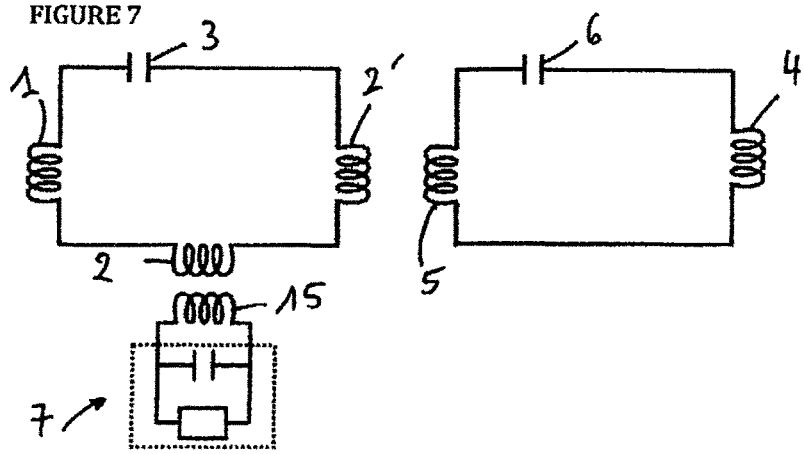
FIG. 7 shows an equivalent circuit diagram of the chip card of FIG. 5, in the case of ID1 antennae having their resonant capacitors connected in series with said antennae.
Figure 8:
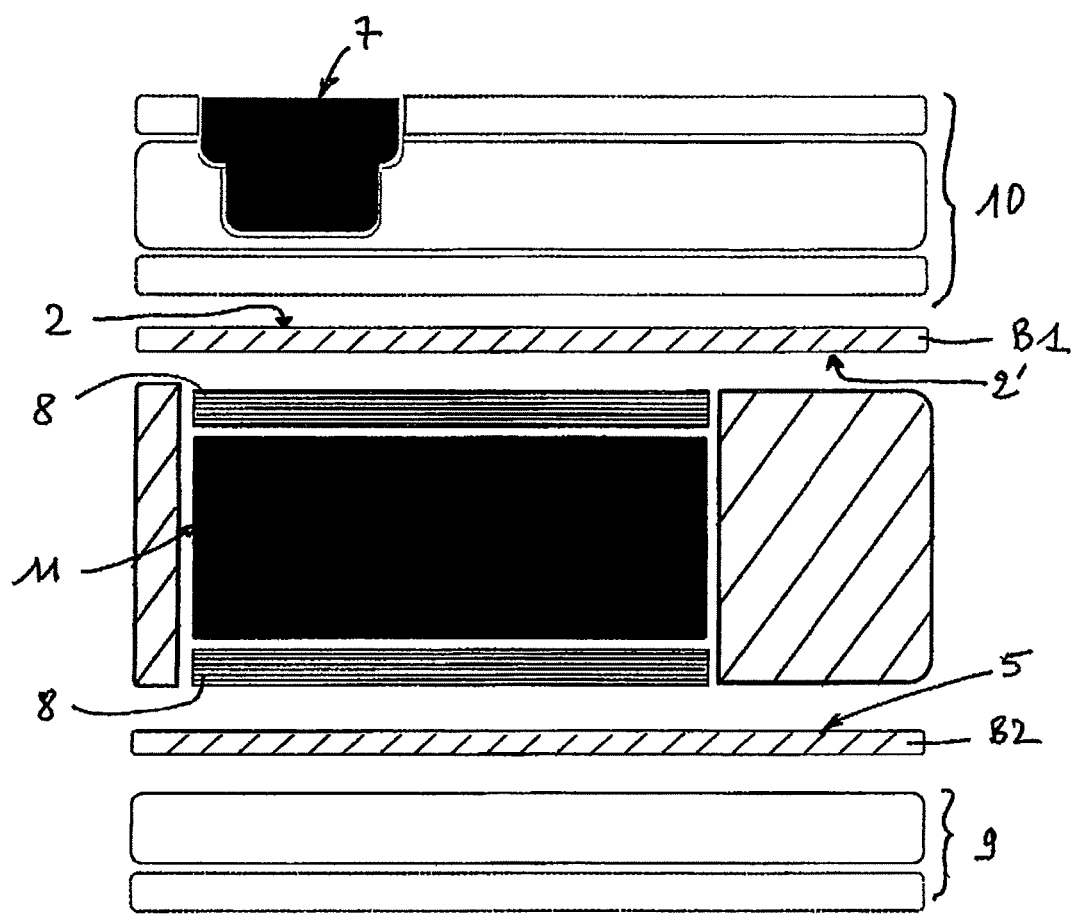
FIG. 8 shows a schematic cross-sectional view of the chip card cut along the line B-B of FIG. 5.

As may be seen in FIG. 4, a plurality of upper layers form an assembly 10, for example a white core flanked on either side by a transparent layer. In the same way, two plastic layers form a lower protective assembly 9. The assembly 10 includes a cavity receiving the microelectronic module 7, this meaning that the thickness of the upper assembly 10 may be slightly larger than that of the lower assembly 9, but this structural difference regarding the plastic layers has no effect on the electromagnetic operation of the chip card.

FIG. 4 corresponds to a section of FIG. 1 cut along the section line A-A that passes through the aperture 12 of the metal plate 11, which is filled with a plastic. It may clearly be seen that in this zone the concentrators 2, 5 may communicate through the aperture 12 or the plastic, without being hindered by the metal plate 11 that is absent facing the concentrators.

Thus, the physical structure of the embodiment of FIGS. 1 and 4 achieves the set objective consisting in integrating a metal plate 11 into the insert of the chip card in order to increase its weight, while having a minimum impact on the electromagnetic operation of the card. It will in particular be noted that, by virtue of the electromagnetic link between the two boosters B1, B2 via their respective concentrator 2, 5, the operation of the insert of the card with a reader will be almost symmetric, and independent of the orientation of the card with respect to the reader, despite the presence of the metal plate 11.

Figure 2:
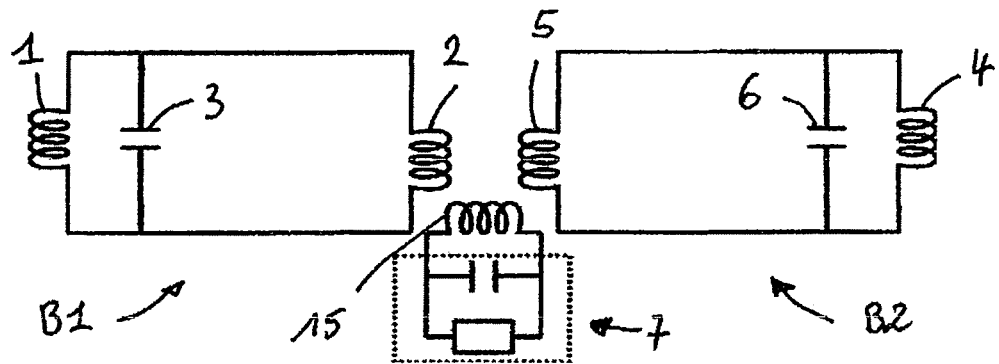
FIG. 2 shows an equivalent circuit diagram of the chip card of FIG. 1, in the case of ID1 antennae having their resonant capacitors connected in parallel with said antennae.
Figure 3:
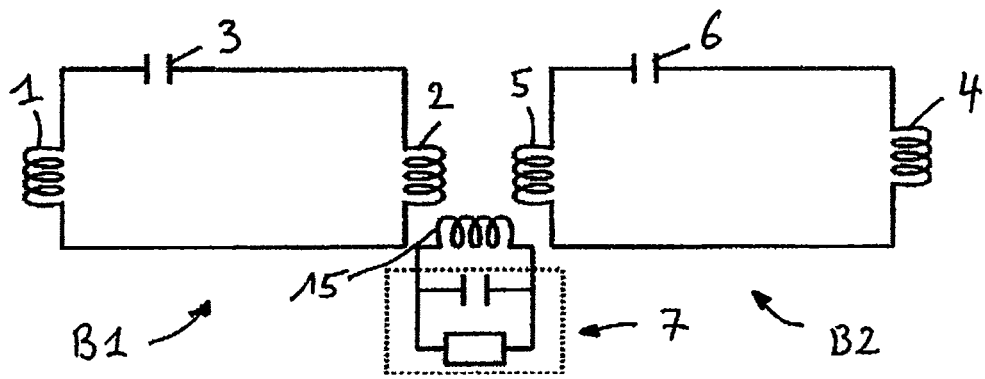
FIG. 3 shows an equivalent circuit diagram of the chip card of FIG. 1, in the case of ID1 antennae having their resonant capacitors connected in series with said antennae.

As shown in the equivalent circuit diagrams of FIGS. 2 and 3, each concentrator 2, 5 may be connected in parallel with its resonant capacitor 3, 6 (FIG. 2), or in series therewith (FIG. 3). Fundamentally, each booster B1, B2 is an RLC circuit that may be of series or parallel type depending on the application and the desired communication performance. The equivalent circuit of the communication stage of the microelectronic module 7 of the chip card, which consists of an RLC circuit the antenna of which is referenced 15, has also been shown.

FIGS. 5 to 8 show one variant of the preceding embodiment (FIGS. 1 to 4), in which variant the first booster B1 includes two concentrators 2, 2' that are connected in series or in parallel with a capacitor 3 for adjusting the resonant frequency of the booster B1. The booster B2 is not modified with respect to the preceding case, except that the concentrator 5 of the booster B2 is no longer positioned facing the concentrator 2 as in the preceding case, but facing the concentrator 2'. The concentrator 2' of the booster B1 and the concentrator 5 of the booster B2 also face an aperture 12' in the metal plate 11, this ensuring that it is possible for the two boosters B1, B2 to communicate, whereas the concentrators 2, 5 of the boosters B1, B2 are not themselves facing each other.

Therefore, it will noted that in each of the preceding cases (FIGS. 1 to 4 and FIGS. 5 to 8), the communication between the boosters B1, B2 located on either side of the metal plate 11 requires the presence of an aperture 12, 12' in this plate, this slightly decreasing the sought-after weight effect due to the metal plate.

The third and fourth embodiments, which are shown in FIGS. 9 to 15, improve the solution of the invention on this particular point, by replacing the single metal plate 11 provided with an aperture 12 or 12' with two apertureless metal half-plates 11a, 11b (FIG. 9) that are electrically insulated from each other by a slit 18.

Figure 9:
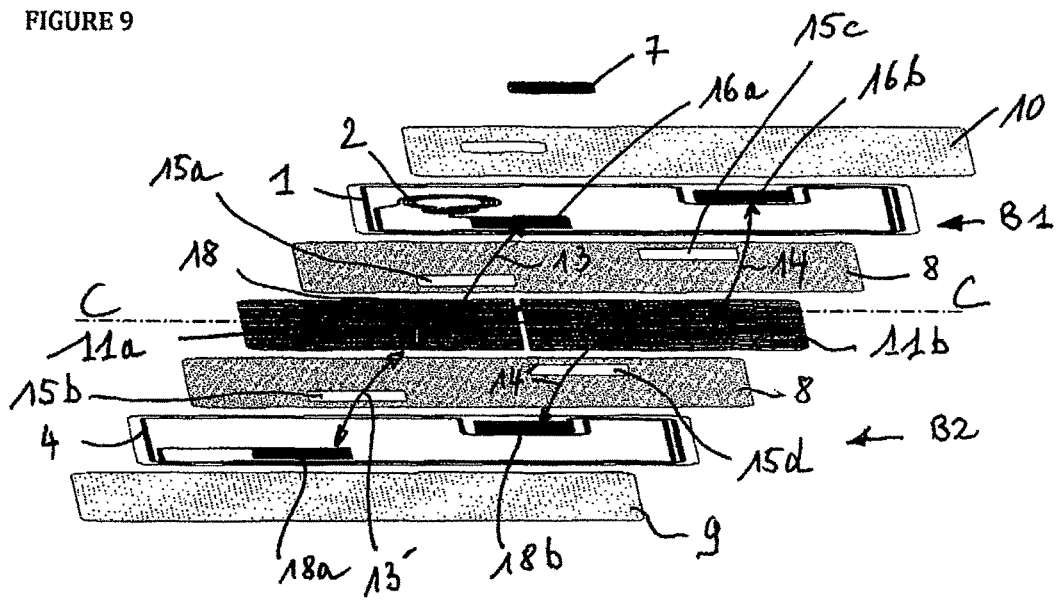
FIG. 9 shows an exploded perspective view of a chip card according to the invention, according to a third embodiment.
Figure 10:
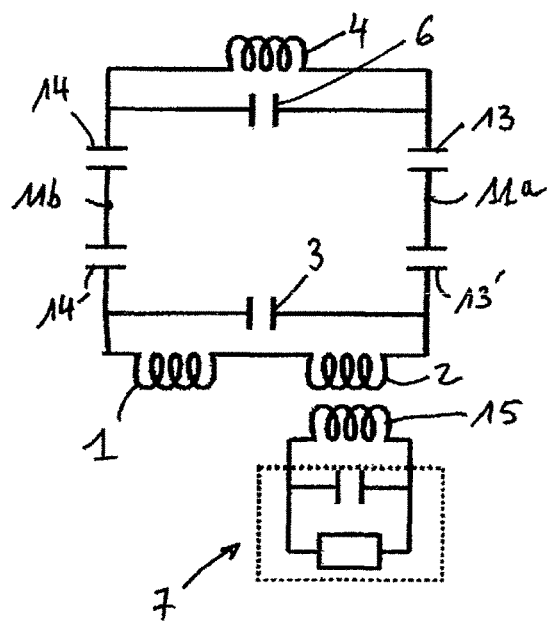
FIG. 10 shows an equivalent circuit diagram of the chip card of FIG. 9, in the case of ID1 antennae having their resonant capacitors connected in parallel.
Figure 11:
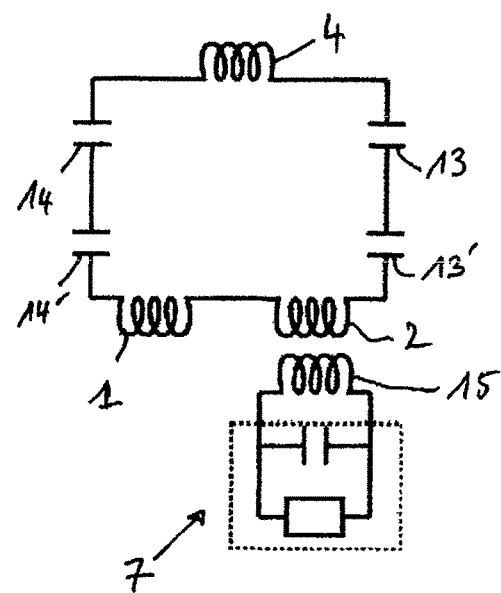
FIG. 11 shows an equivalent circuit diagram of the chip card of FIG. 9, in the case of ID1 antennae having their resonant capacitors connected in series.
Figure 12:
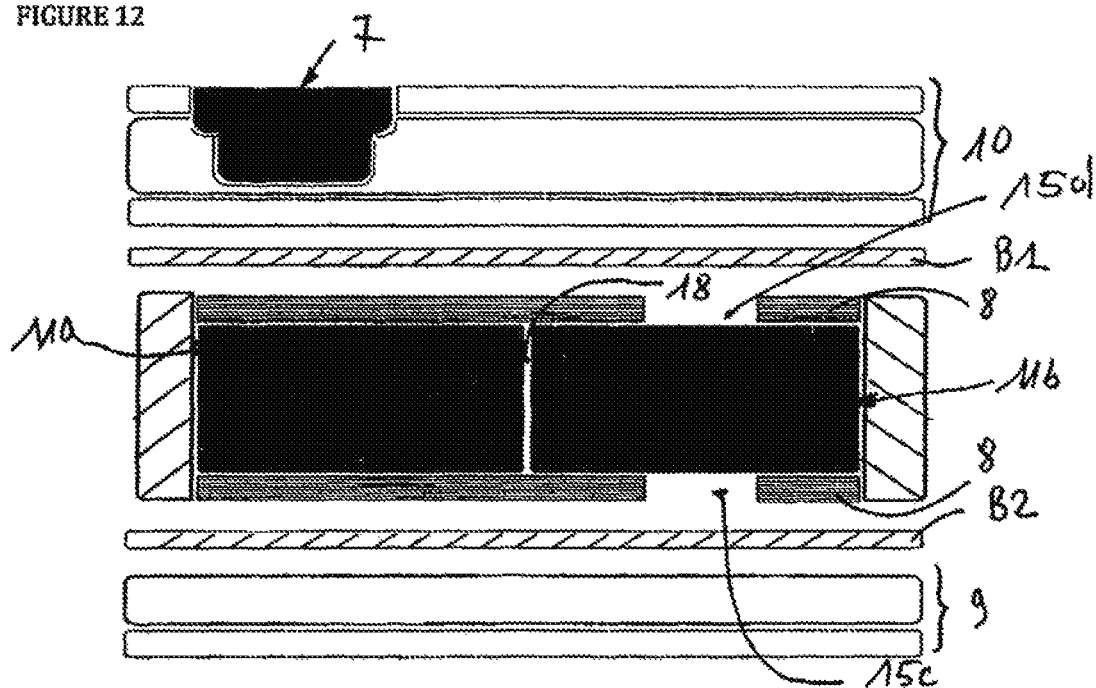
FIG. 12 shows a schematic cross-sectional view of the chip card cut along the line C-C of FIGS. 9 and 13.
Figure 13:
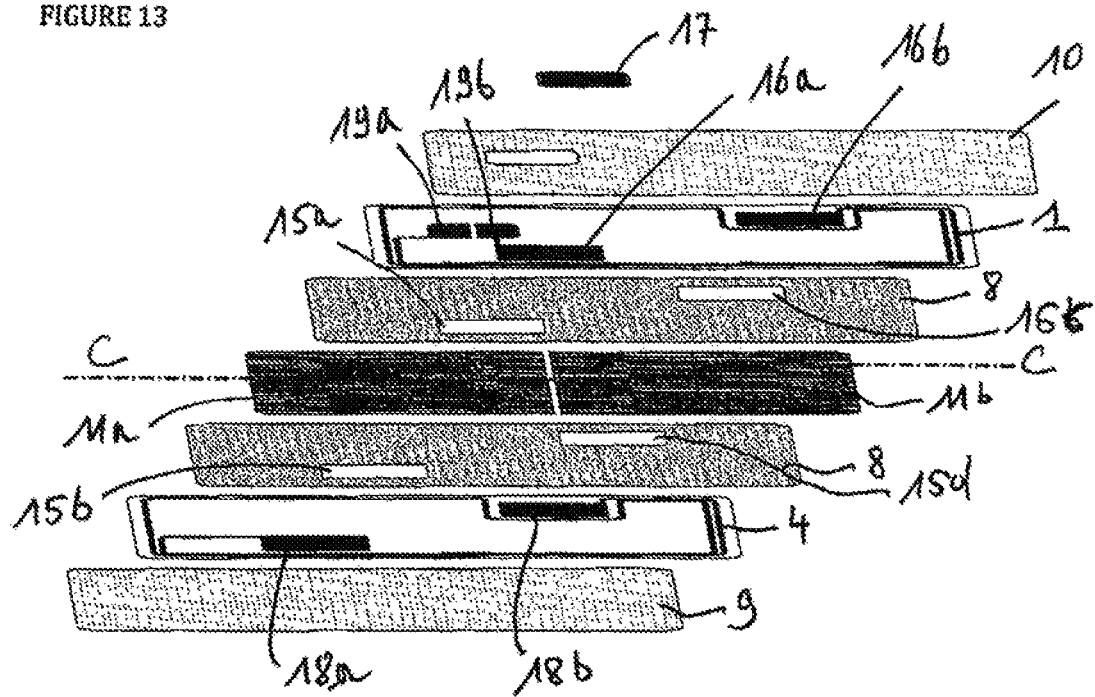
FIG. 13 shows an exploded perspective view of a chip card according to the invention, according to a fourth embodiment.

FIG. 12 is a cross-sectional view of both the embodiment of FIG. 9 and the embodiment of FIG. 13.

In order to allow the two boosters B1, B2 located on either side of the metal plates 11a, 11b to communicate, the structure of these boosters is also modified, so that communication therebetween is achieved via a capacitive effect and no longer via concentrator antennae.

To this end, the booster B1 includes metal stubs 16a, 16b, and the booster B2 includes metal stubs 18a, 18b. These metal stubs allow, with the metal half-plates 11a, 11b, capacitors 13, 13', 14, 14' to be formed allowing, through apertures 15a, 15b, 15c, 15d in the ferrite layers 8, the two boosters B1, B2 on either side of the two metal half-plates 11a, 11b, to be capacitively connected.

The advantages of this embodiment reside in the absence of aperture 12 in the metal plates 11a, 11b, this maximizing the sought-after weight effect in the chip card. Furthermore, if the effect of the field of the reader picked up directly by the antenna 15 of the module 7 and by the concentrator 2 is neglected, the operation of the chip card remains almost symmetric and independent of the orientation of the chip card with respect to the reader.

Figure 14:
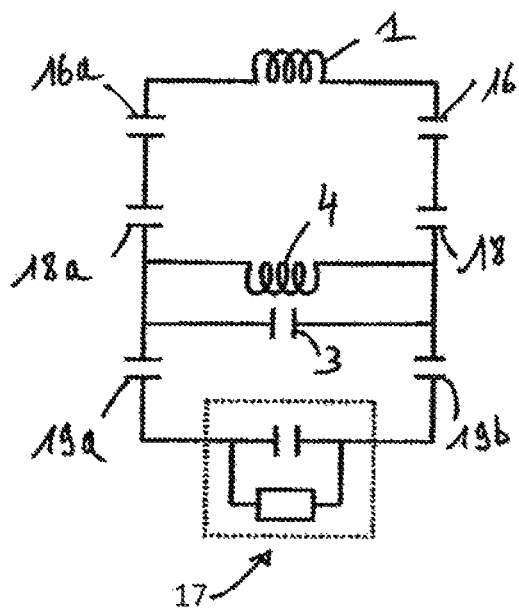
FIG. 14 shows an equivalent circuit diagram of the chip card of FIG. 13, in the case of ID1 antennae having their inductors connected in parallel.
Figure 15:
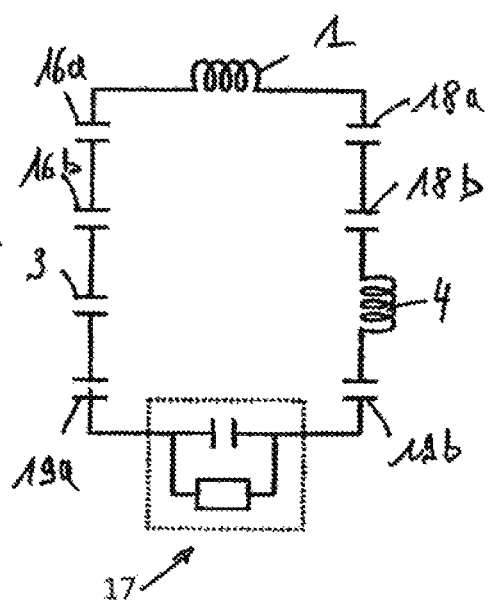
FIG. 15 shows an equivalent circuit diagram of the chip card of FIG. 13, in the case of ID1 antennae having their inductors connected in series.

The embodiment of FIGS. 13 to 15 differs from the preceding embodiment (FIGS. 9 to 12) only in that a capacitive module 17 is used instead of the inductive module 7. This embodiment preserves the advantages associated with the two metal half-plates 11a, 11b, but adds thereto that of a completely symmetric operation because the capacitive module 17 picks up no magnetic field from the reader, in contrast to the inductive module 7.

Figure 16:
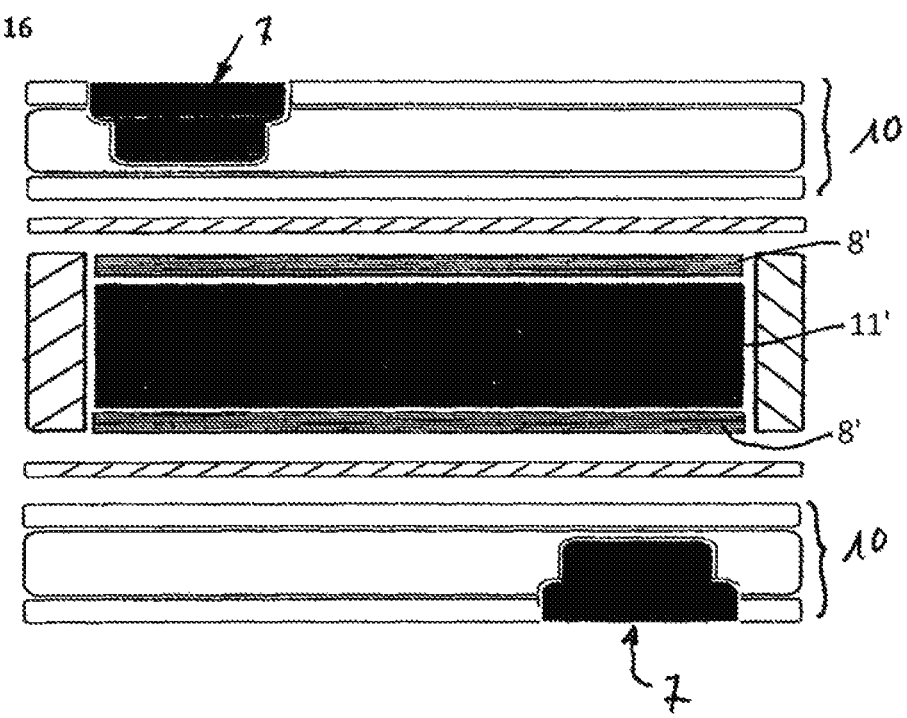
FIG. 16 shows a cross-sectional view of a variant chip card comprising two contactless or hybrid microelectronic modules that are entirely separated by a metal plate.

FIG. 16 shows in cross section a variant embodiment that, contrary to the preceding embodiments (FIGS. 4, 8 and 12), uses an unapertured metal plate 11' and two ferrite sheets 8' that cover almost all of the area of the chip card. This card includes two contactless electronic modules that are independent and incapable of communicating with each other at radiofrequencies because of the presence of the metal plate 11'. These modules each communicate independently with a chip-card reader. This embodiment has a high cost because of the presence of two microelectronic modules, but it is of simple construction and allows the weight of the card to be maximized for a given thickness.

Advantages of the Invention

In summary, the invention proposes a design for a chip-card insert and for a chip card allowing the targeted aims to be achieved. It uses a plate made of a heavy material, typically a metal such as tungsten or an equivalent, and a structure that allows the shielding effects of this metal plate, with respect to the radiofrequency signals to be exchanged with a chip-card reader, to be obviated or limited.

In particular, the chip-card structure according to the invention allows, on each side of the chip-card, levels of RF communication performance that are entirely satisfactory with respect to the relevant standards. Furthermore, these performance levels are, according to the applicational requirements, substantially symmetric so that the user will be able to present the chip card in any orientation with respect to the chip-card reader.

The invention claimed is:

1. An insert for a contactless or hybrid contact/contactless chip card, said insert including a body provided with a cavity in which an electronic module provided with a microchip that is connected to a capacitive or inductive coupling means is located, wherein the body is formed from a stack of layers at least one first layer of which includes a first booster antenna and one second layer of which includes a second booster antenna, said booster antennae being coupled together inductively and/or capacitively, and at least one of the booster antennae being coupled inductively and/or capacitively to the coupling means of the module, and wherein the body furthermore includes at least one metal plate that is placed between two ferrite layers, said at least one metal plate and two ferrite layers being arranged between the first layer and the second layer, said first and second booster antennae and said metal plate being arranged so that at least one of the two booster antennae and the electronic module remain inductively and/or capacitively coupled to each other despite the presence of the metal plate.

2. The chip-card insert as claimed in claim 1, wherein the electronic module is an inductive module provided with an antenna, and wherein each booster includes an antenna that is substantially in the ID1 format of standard ISO/CEO 7810, said antenna being connected in series or parallel with a concentrator antenna and with a capacitor for adjusting the resonant frequency of each booster, the concentrator antennae of each booster and the antenna of the electronic module being located substantially facing so as to allow the module and the concentrator antennae to be coupled.

3. The chip-card insert as claimed in claim 2, wherein said metal plate and the ferrite layers are provided with an aperture in the zone of overlap of the two concentrator antennae, so as to facilitate the electromagnetic coupling of the two concentrator antennae and to decrease an electromagnetic shielding effect due to the metal plate.

4. The chip-card insert as claimed in claim 1, wherein said electronic module is an inductive module provided with an antenna, said first booster being provided with an antenna that is substantially in the ID1 format, said antenna being connected in series with a first concentrator antenna that is located substantially facing the antenna of the module and a second concentrator antenna, and said second booster being provided with an antenna that is substantially in the ID1 format, said antenna being connected in series with a third concentrator antenna, the second and third concentrator antennae being located substantially facing, so as to allow the first concentrator antenna and the third concentrator antenna to be coupled via the second concentrator antenna.

5. The chip-card insert as claimed in claim 1, wherein the electronic module is an inductive module provided with an antenna, the metal plate being formed from two half-plates that are insulated from each other, wherein said first booster includes an antenna that is substantially in the ID1 format and a concentrator antenna in series or in parallel, and furthermore includes two metal stubs allowing capacitive connections to be made with a first metal half-plate, and wherein said second booster includes an antenna that is substantially in the ID1 format and two metal stubs allowing capacitive connections to be made with a second metal half-plate.

6. The chip-card insert as claimed in claim 5, wherein the inductive module is replaced by a capacitive module, and wherein the concentrator antenna of said first booster is replaced by metal stubs that are able to establish a capacitive link between said first booster and said capacitive module.

7. The chip-card insert as claimed in claim 6, wherein the ID1 antennae of the two boosters are connected in parallel.

8. The chip-card insert as claimed in claim 1, wherein the ID1-format antennae of the two boosters are connected in parallel with a capacitor (3, 6) for adjusting the resonant frequency of said boosters.

9. The chip-card insert as claimed in claim 1, wherein the ID1-format antennae of the boosters are connected in series with a capacitor for adjusting the resonant frequency of the boosters.

10. The insert as claimed in claim 1, wherein the metal plate is made of tungsten, gold, iridium, osmium, platinum or silver.

11. The insert of claim 10, wherein the metal plate is made of tungsten.

12. A chip card, including an insert as claimed in claim 1, and, on either side of said insert, at least one protective layer made of plastic.

13. The chip card as claimed in claim 12, wherein the metal plate has a thickness of about 100 microns to 400 microns, the total thickness of the card being between 680 and 950 microns.

14. The chip card of claim 13, wherein the total thickness of the card is between 680 and 840 microns.

15. The chip card as claimed in claim 12, wherein the metal plate has a weight of about 10 to 25 grams, the total weight of the chip card being about 15 to 30 grams.

* * * * *